United States Patent [19]

Elkin

[11] Patent Number: 4,768,884
[45] Date of Patent: Sep. 6, 1988

[54] CEMENT MIXER FOR FAST SETTING MATERIALS

[76] Inventor: Luther V. Elkin, 1423 Florence Ave., Indiana, Pa. 15701

[21] Appl. No.: 21,157

[22] Filed: Mar. 3, 1987

[51] Int. Cl.$^4$ .......................... B28C 5/12; B28C 7/10; B28C 7/12; B28C 7/16
[52] U.S. Cl. ........................... 366/28; 366/40; 366/50
[58] Field of Search ............ 366/19, 20, 27, 28, 366/29, 33, 34, 35, 37, 38, 40, 42, 50, 81, 90, 266, 318, 319, 320, 322, 324, 6, 8, 14; 414/504, 505, 526, 503; 212/413; 198/657, 675, 676

[56] References Cited

U.S. PATENT DOCUMENTS

| | | | |
|---|---|---|---|
| 1,521,044 | 12/1924 | Parker | 366/266 |
| 2,585,169 | 2/1952 | Potter | 414/505 |
| 2,976,025 | 3/1961 | Pro | 366/20 |
| 3,228,663 | 1/1966 | Travis | 366/27 |
| 3,682,448 | 8/1972 | Kedzior et al. | 366/6 |
| 3,820,914 | 6/1974 | Zimmerman | 366/19 X |
| 4,285,598 | 8/1981 | Horton | 366/19 X |
| 4,422,767 | 12/1983 | Yelton | 366/40 |
| 4,579,459 | 4/1986 | Zimmerman | 366/27 |
| 4,611,612 | 9/1986 | Obie et al. | 366/319 X |

FOREIGN PATENT DOCUMENTS

| | | | |
|---|---|---|---|
| 26473/30 | 5/1931 | Australia | 366/38 |
| 2098497 | 11/1982 | United Kingdom | 366/64 |

Primary Examiner—Harvey C. Hornsby
Assistant Examiner—S. Haugland
Attorney, Agent, or Firm—Webb, Burden, Ziesenheim & Webb

[57] ABSTRACT

A cement mixer includes receptacles for the aggregate, cement, water and additive which are mixed together to form a concrete mixture. A conveyor extends from an aggregate bin to a cross auger beneath a cement bin. A plurality of mixing augers extends along the side of the cement mixer from the cross auger to the rear of the cement mixer. The mixing augers each include a helical auger fin preferably having a plurality of notches spaced along an outer edge of the auger fin. The auger boot may include a mechanism for adjusting the distance between the auger boot and the auger fin.

24 Claims, 2 Drawing Sheets

CEMENT MIXER FOR FAST SETTING MATERIALS

BACKGROUND OF THE INVENTION (1) Field of the Invention

This invention relates to cement mixers and, more particularly, to a cement mixer adapted to automatically mix small batches of concrete from reservoirs of cement, aggregate, water and additives.

(2) Description of the Prior Art

Cement mixers mounted to the chassis of vehicles are known in the art. Such cement mixers make concrete by mixing aggregate, cement and water together in one mixing bin. The cement mixers then travel to one or more work sites and selectively deposit a predetermined amount of concrete at each site. Typically, the concrete is continually agitated in the mixing bin to prevent setting of the mixture.

Additives, such as admixtures, may be blended with the concrete mixture. Admixtures are substances which alter the normal properties of mortars or concrete so as to improve them for a particular purpose. Admixtures are frequently used to entrain air, increase workability, accelerate or retard setting, provide a pozzolanic reaction with lime, reduce shrinkage and reduce bleeding.

The time needed for the setting of concrete can be greatly reduced by using the proper admixture. Conventional cement mixers mounted to a vehicle's chassis can, at best, deposit fast setting concrete at only one work site.

Accordingly, it is an object of this invention to provide a cement mixer which mixes an amount of concrete having an additive, such as a fast setting additive, as required at a particular work site.

It is yet another object of this invention to provide a cement mixer which can accurately dispense an additive to a concrete mixture as required at a particular work site.

It is also known in the art to transport and mix concrete along an elongated trough by means of a helical screw or auger fin. Concrete having a fast setting additive tends to clog both the auger fin and the area between an inner surface of an auger boot and an outer edge of the auger fin. In such prior art devices the concrete is not sufficiently mixed and backs up in the auger boot.

Therefore, it is another object of the present invention to provide a mixing auger which has improved mixing capabilities and will not become clogged when mixing fast setting concretes.

SUMMARY OF THE INVENTION

I have invented a cement mixer mounted to a chassis of a vehicle which includes an aggregate bin mounted to a rear portion of the chassis and a cement bin mounted to the chassis forward of the aggregate bin. The cement bin has dispensing means, such as a metering wheel, at a lower end thereof. The cement mixer includes a cross auger disposed beneath the dispensing means of the cement bin and adapted to receive cement therefrom. A conveyor extends through the aggregate bin and has a dispensing end in fluid communication with the cross auger.

A plurality of mixing augers are mounted to the chassis and extend serially along one side from the cross auger to a rear end of the chassis. The dispensing end of one mixing auger is in fluid communication with the receiving end of the mixing auger immediately adjacent thereto. The receiving end of a first mixing auger is in fluid communication with the dispensing end of the cross auger. Each of the mixing augers has raising and lowering means attached thereto. The mixer further includes means for rotating the last mixing auger about its receiving end. In this manner the dispensing end of the last mixing auger may be positioned for dispensing concrete. A water tank is mounted to the chassis and has means for dispensing water into one or more of the mixing augers. An additive tank is mounted to the chassis and has means for dispensing an additive into one or more of the mixing augers.

The cement mixer may also include means for rotating the first mixing auger about its receiving end in order to position the dispensing end of the first mixing auger for dispensing concrete.

The mixing augers each preferably include an auger boot surrounding a helical auger fin. The auger fin has a plurality of notches with outwardly extending tabs. The notches are spaced along an outer edge of the auger fin.

The auger boot may be flexible and include means for adjusting the auger boot to modify the distance between an inner surface of the auger boot and an outer edge of the auger fin. This permits the mixing capability of the mixing augers to be adjusted. The means for adjusting the auger boot includes at least one elongated rod disposed along and in contact with the auger boot along its outer surface. Preferably, a pair of elongated rods are disposed along opposed sides of the auger boot. The position of each elongated rod is adjusted by at least one rod receiving bracket mounted to the mixing auger and adjacent its outer surface. A guide pin is slidably carried by the bracket and has an end mounted to the elongated rod. An adjusting bolt is threadably carried by the bracket and has an end contacting the elongated rod. Rotation of the bolt will adjust the position of the rod and flex the auger boot to varying positions.

DESCRIPTION OF THE PREFERRED EMBODIMENTS

Figures 1, 2:
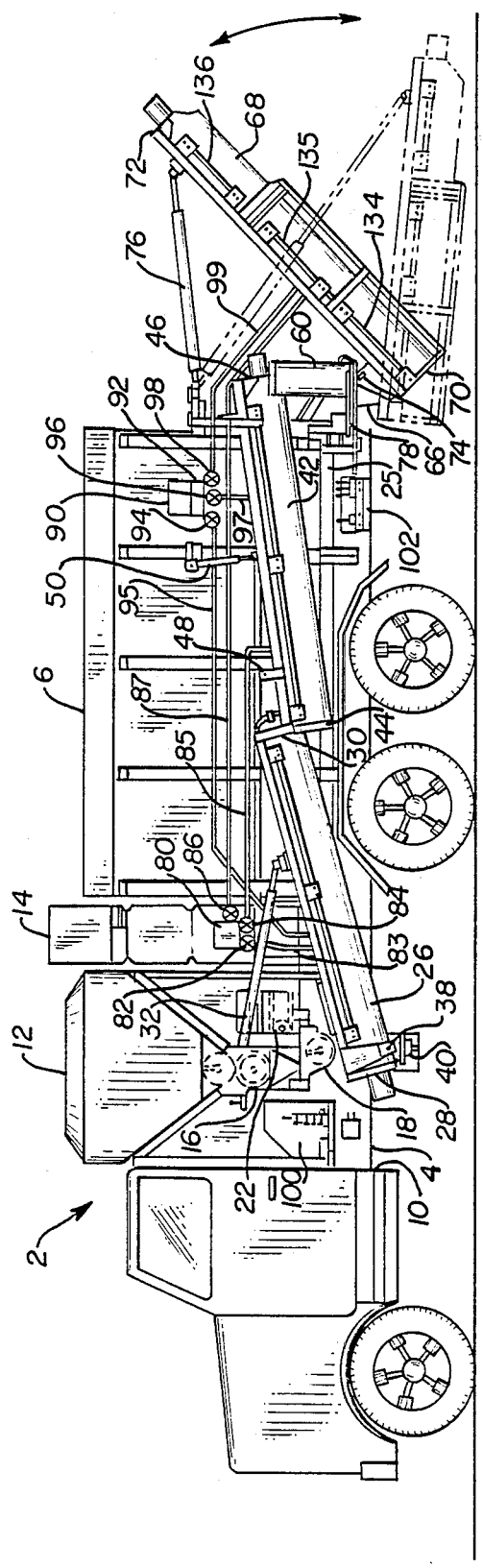
FIG. 1 is a side view of a cement mixer in accordance with the present invention.
FIG. 2 is a top view of the cement mixer shown in FIG. 1.
Figure 3:
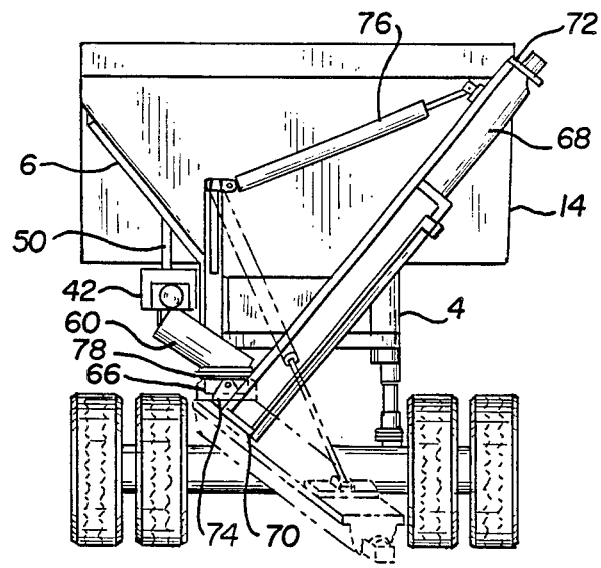
FIG. 3 is a rear view of the cement mixer shown in FIG. 1.

A cement mixer 2 mounted to a chassis 4 of a vehicle in accordance with the present invention is shown in FIGS. 1, 2 and 3. The cement mixer 2 includes an aggregate bin 6 mounted to a rear portion of the chassis 4. The aggregate bin 6 contains aggregate, such as sand or gravel, which is mixed with other materials to make concrete. The aggregate bin 6 has a wall 7 extending lengthwise through its middle which divides the aggregate bin 6 into separate areas for coarse and fine aggregate, such as gravel and sand. The aggregate bin 6 may have an open or closed top and also have downwardly sloping sides to direct the aggregate to a conveyor 8 or the like extending through the bottom of the aggregate bin 6 and beneath wall 7.

The conveyor 8 moves the course and fine aggregate from the aggregate bin 6 toward the front end 10 of the chassis 4 and is positioned below both a cement bin 12 and a water tank 14. The cement bin 12 is mounted to the chassis 4 forward of the aggregate bin 6 and toward the front end 10 of the chassis 4. The water tank 14 is mounted to the chassis 4 and is positioned between the cement bin 12 and aggregate bin 6. The cement bin 12 contains cement, which is mixed with the aggregate, and has a closed top and downwardly sloping sides to direct the cement to a cement dispensing means, such as a cement metering wheel 16, at a lower end. The metering wheel 16 accurately dispenses the cement into a cross auger 18 which is positioned below and in fluid communication with the metering wheel 16. The conveyor 8 and the cross auger 18 may be driven by variable spaced hydraulic motors or the like.

The cross auger 18 is positioned beneath and in fluid communication with a dispensing end 22 of the conveyor 8. The metering wheel 16 is preferably located immediately above a dispensing end 24 of the cross auger 18. The cross auger 18 thoroughly mixes together the aggregate received from the conveyor 8. The cross auger 18 is of sufficient length to mix and transport the coarse and fine aggregate toward the dispensing end 24 of the cross auger 18 on one side of the chassis 4 where a plurality of mixing augers are located. The mixing augers 26, 42 and 48 are mounted to the chassis 4 and extend serially along one side of the chassis 4 from the cross auger 18 toward a rear end 25 of the chassis 4. The embodiment of the invention illustrated in the figures has three mixing augers, although any number of mixing augers greater than one may be used.

A first mixing auger 26 has a receiving end 28 and a dispensing end 30. The first mixing auger 26 is mounted to the chassis 4 with its receiving end 28 located beneath and in fluid communication with the dispensing end 24 of the cross auger 18. A hydraulic cylinder 32 enables the dispensing end 30 of the firs mixing auger 26 to be raised and lowered. One end of cylinder 32 is rotatably mounted to the chassis 4 while the other end is rotatably mounted to the first mixing auger 26 toward its dispensing end 30. Pivot 38 mounted between the chassis 4 and the first mixing auger 26 near its receiving end 28 permits the first mixing auger 26 to move when cylinder 32 is activated. A first mixing auger swivel 40 mounted between the chassis 4 and the receiving end 28 of the first mixing auger 26 enables the first mixing auger 26 to be rotated about its receiving end 28. The first mixing auger 26 may be rotated by the first auger swivel 40 in order to lower its dispensing end 30 over a work site for the direct dispensing of concrete.

A second mixing auger 42 is mounted to the chassis 4 downstream of the first mixing auger 26 and has a receiving end 44 positioned beneath and in fluid communication with the dispensing end 30 of the first mixing auger 26. The second mixing auger 42 also has a dispensing end 46 opposite its receiving end 44. The second mixing auger 42 is pivotally connected to the chassis 4 by pivot 48 located near its receiving end 44. A hydraulic cylinder 50 is mounted between the chassis 4 and the second mixing auger 42 and enables the second mixing auger 42 to be raised and lowered and pivoted about pivot 48.

A chute 60 is removably mounted to the rear end 25 of the chassis 4 with its upper end positioned beneath and in fluid communication with the dispensing end 46 of the second mixing auger 42. A bowl 66 is mounted to the chassis 4 beneath and in fluid communication with the lower end of the chute 60.

A third mixing auger 68 is mounted to the chassis 4 downstream of the second mixing auger 42 and has a receiving end 70 located beneath and in fluid communication with the outlet of the bowl 66. The receiving end 70 of the third mixing auger 68 is in fluid communication with the dispensing end 46 of the second mixing auger 42 through the chute 60 and bowl 66. The third mixing auger 68 also has a dispensing end 72 opposite its receiving end 70. The third mixing auger 68 is pivotally connected to the chassis 4, preferably directly to the bowl 66, by pivot 74 located near its receiving end 70. A hydraulic cylinder 76 enables the dispensing end 72 of the third mixing auger 68 to be raised and lowered. One end of cylinder 76 is rotatably mounted to the chassis 4 while the other end of cylinder 76 is rotatably mounted to the third mixing auger 68 near its dispensing end 72. The third mixing auger 68 may be pivoted vertically about its receiving end 70 via pivot 74 when cylinder 76 is activated. A third mixing auger swivel 78, such as a chain drive mechanism, is mounted between the receiving end 70 of the third mixing auger 68 and the chassis 4. Swivel 78 enables the third mixing auger 68 to be rotated horizontally about its receiving end 70. Typically, the third mixing auger 68 has its dispensing end 72 in an upward position as illustrated in FIG. 3. When the concrete is to be dispensed at a work site the cylinder 76 is activated and the third mixing auger 68 is lowered. In addition, swivel 78 is activated to precisely position the dispensing end 72 of the mixing auger 68 as determined by the work site.

Water is dispensed from the water tank 14 to the various mixing augers by means of a dispensing pump 80. The water may flow through piping, such as plastic tubing, to each mixing auger, with the flow controlled by an associated control valve. As shown in FIG. 1, water flows from the water tank 14 through pump 80, valve 82 and pipe 83 to the first mixing auger 26. Similarly, water flows through pump 80, valve 84, and pipe 85 to the second mixing auger 42 and through pump 80, valve 86 and pipe 87 to the third mixing auger 68.

In order to change the characteristics of the concrete mixture, such as to make the mixture fast setting, a liquid additive may be mixed with the cement, aggregate and water mixture. Preferably, the additive is added along with the water in the mixing augers. To this end an additive tank 90 is mounted to the chassis 4 of the cement mixer 2 at room convenient location. The additive tank 90 will be generally much smaller than the aggregate bin 6, cement bin 12 and water tank 14. As shown on FIG. 1, the additive tank 90 is mounted along one side of the aggregate bin 6.

The liquid additive is accurately dispensed from the additive tank 90 to the mixing augers by means of a dispensing pump 92, such as a peristaltic pump. The additive flows through piping, such as plastic tubing, to each mixing auger, with the flow controlled by an associated control valve. As shown in FIG. 1, the additive flows from the additive tank 90 through pump 92, valve 94 and pipe 95 to the first mixing auger 26. Similarly, additive flows through pump 92, valve 96 and pipe 97 to the second mixing auger 42 and through pump 92, valve 98 and pipe 99 to the third mixing auger 68.

A mixing auger particularly adapted for use in the cement mixer 2 of the present invention is shown in FIGS. 4–8. The mixing auger 104 includes an elongated, open topped trough or auger boot 106 surrounding a screw or helical auger fin 108 which is mounted on shaft 110 and powered by an auger motor 112, such as a variable speed hydraulic motor operable in both forward and reverse directions. The auger boot 106 may be closed at each end by end plates 113, 114. The auger motor 112 is carried by end plate 114. An opening 115 adjacent end wall 114 allows the concrete mixture to be dispensed from the mixing auger 104. Rotation of the auger fin 108 causes material carried by the auger boot 106 to move therealong from one end to the other, depending on the direction of rotation of the auger fin 108.

Due to the properties of fast setting concrete, conventional helical auger fins may not properly mix together the elements of the concrete mixture. In order to overcome this problem, the auger fin 108 of the mixing auger 104 shown in FIGS. 4–7 includes a plurality of notches 116 spaced along its outer edge 117. The notches 116 are formed by making opposed cuts into the auger fin 108 and bending tabs 118 down until they are substantially parallel with the shaft 110. Preferably the opposed cuts follow along radial lines extending outwardly from the center of the auger fin 108. The tabs 118 form the bottom edge of the notches 116 and extend outwardly therefrom. The notches 116 are spaced along the auger fin 108 in either a regular or irregular fashion as desired. The notches 116 permit the mixture to move in both directions simultaneously for a more thorough and consistent mixing action.

A 9′ long, 12″ diameter auger fin was modified with notches and corresponding tabs which were 4″ wide at the outer surface of the auger fin and were 2″ deep. The notches were spaced along the length of the outer edge of the auger fin as follows:

| Helical Measurement | Notch Number |
|---|---|
| 56¼″ | 1 |
| 12½″ | 2 |
| 12½″ | 3 |
| 6¼″ | 4 |
| 6¼″ | 5 |
| 6¼″ | 6 |
| 12½″ | 7 |
| 18¾″ | 8 |
| 18¾″ | 9 |
| 25″ | 10 |
| 6¼″ | 11 |
| 6¼″ | 12 |
| 6¼″ | 13 |
| 6¼″ | 14 |
| 12½″ | 15 |

The helical measurements above are given from the end of one notch to the beginning of the next notch. The measurement of the first notch is given from the end of the auger fin.

Another problem with conventional mixing augers is a build up of material between the inner surface of the auger boot and the auger fin. This is a particular problem when mixing fast setting materials. When the material builds up it will dry out and fall back into the concrete mixture. This will cause both wet and dry material to be discharged and causes an inconsistency in the concrete mixture and variations in the mixing auger dispensing height.

Figure 8:
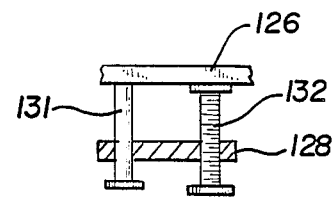
FIG. 8 is a top view, partially in section, of a rod receiving bracket shown in FIG. 4.
Figure 4:
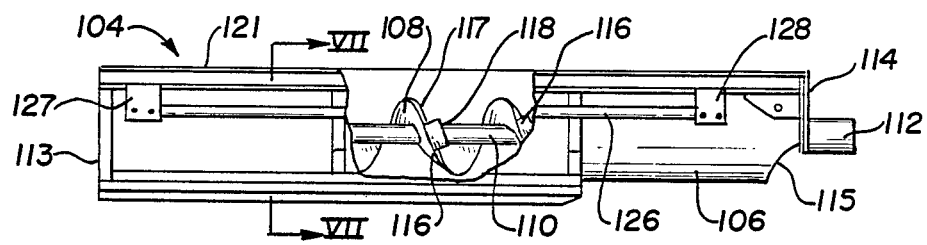
FIG. 4 is a side view, partially in section, of a cement mixing auger used in the mixer shown in FIG. 1.
Figures 5, 6, 7:
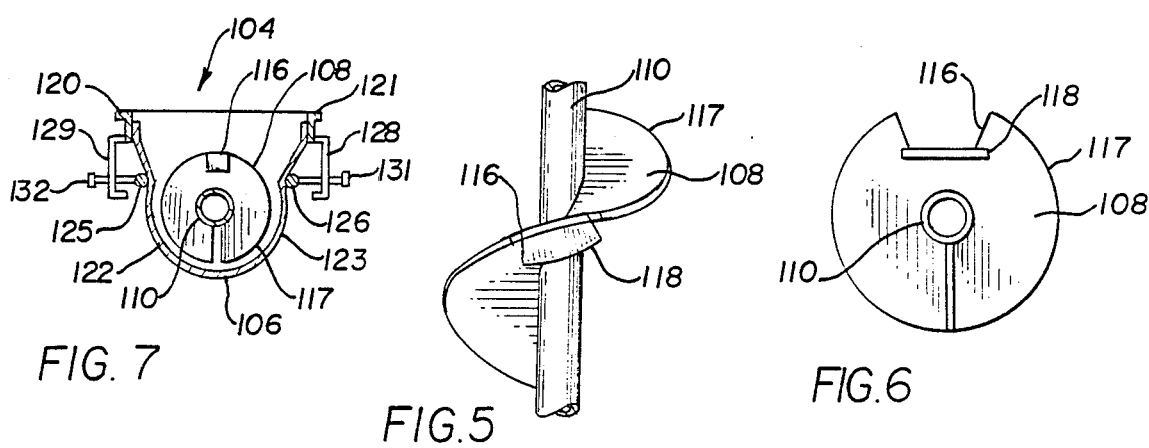
FIG. 5 is a top view of a portion of the helical auger fin shown in FIG. 4.
FIG. 6 is a front view of the helical auger fin shown in FIG. 5.
FIG. 7 is a section taken along lines VII—VII in FIG. 4.

The mixing auger 104 shown in FIGS. 4, 7 and 8 includes a modification adapted to overcome this problem. The auger boot 106 is formed of a flexible material, such as rubber, and extends between and is carried by opposed frame members 120, 121. The auger boot 106 has opposed sides 122, 123 which are essentially symmetrical about the auger fin 108. At least one elongated rod is disposed along and in contact with the outer surface of the auger boot 106. In the embodiment shown in FIGS. 4, 7 and 8, elongated rod 125 is positioned along and in contact with the outer surface of side 122 of the auger boot 106. Likewise, elongated rod 126 is positioned along and in contact with the outer surface of side 123 of the auger boot 106. Elongated rod 125 is positioned substantially opposite and in line with elongated rod 126.

The location of the elongated rods 125, 126 may be moved to adjust the position and shape of the auger boot 106 and, accordingly, adjust the distance or spacing between the inner surface of the auger boot 106 and the outer edge 117 of the auger fin 108. The elongated rods 125, 126 are each supported by at least one rod receiving bracket carried by the frame members 120, 121 of the mixing auger 104. The elongated rods are supported by a bracket at each end thereof. Elongated rod 126 is supported by brackets 127, 128 and elongated rod 125 is supported by bracket 129 and by another bracket not shown in the figures. Brackets 127, 128 are mounted along an upper edge to frame member 121 and bracket 129 is mounted along an upper edge to frame member 120.

Bracket 128 is shown in more detail in FIG. 8. A guide pin 131 is slidably carried by bracket 128 and has one end mounted to elongated rod 126 by welding or the like. A threaded adjustment bolt 132 is carried by bracket 128 and has one end in contact with elongated rod 126. By rotating the adjustment bolt 132 in one direction, the bolt 132 will move toward elongated rod 126 and push rod 126 against the auger boot 106, thus flexing the auger boot 106 toward the auger fin 108 inwardly. By rotating the adjustment bolt 132 in the opposite direction, the auger boot 106 will flex outwardly and return toward its original shape. The elongated rod 126 is carried by guide pin 131 as the adjustment bolt 132 is rotated. In this manner the spacing between the inner surface of the auger boot 106 and the outer edge 117 of the auger fin 108 may be adjusted by merely rotating the adjustment bolt 132 on each bracket and moving the associated elongated rod to a desired location.

The mixing auger may include one elongated rod extending along the length of the auger on each side as shown in FIG. 4 and as shown in the first mixing auger 26 and second mixing auger 42 shown in FIG. 1. The mixing auger may also include a plurality of elongated rods extending along each side of the auger, with each rod having separate mounting brackets. This is shown in FIG. 1 where the third mixing auger 68 includes three elongated rods 134, 135 and 136 along each side.

The cement mixer 2 is controlled by an operator by means of a front control panel 100 and a rear control panel 102. An operator can position the mixing augers as is required by the work site. The number of mixing augers used and the precise amount of water and additive required per work site depends on the environmental conditions and the type of additive to be blended with the concrete. A very quick setting additive may require the use of only one mixing auger since the concrete could set in the downstream mixing augers before being deposited at the work site. In addition, the operator may also determine which of the mixing augers require water and additive added to them.

In operation, aggregate from the aggregate bin 6 is deposited onto the conveyor 8, carried toward the dispensing end 22 of the conveyor 8 and deposited into the cross auger 18. The aggregate particles are blended in the cross auger 18 and carried toward the dispensing end 24 of the cross auger 18. Cement is deposited from the cement bin 12 via the metering wheel 16 into the dispensing end 24 of the cross auger 18. The cement and aggregate pass from the cross auger 18 to the first mixing auger 26 at its receiving end 28. The aggregate and cement are blended in the first mixing auger 26. Water from the water tank 14 and an additive from the additive tank 90 may be dispensed into the first mixing auger 26. The mixture in the first mixing auger 26 is carried toward the dispensing end 30 of the first mixing auger 26. The mixture may be dispensed at a work site directly from the first mixing auger 26 by activating both cylinder 32 and the first auger swivel 40 to properly position its dispensing end 30.

The concrete mixture may also be mixed in three mixing augers whereby the concrete is transferred from the first mixing auger 26 to the second mixing auger 42. The concrete mixture is mixed in the second mixing auger 42 and more water and additive may be added. The mixture is then moved toward the dispensing end 46 of the second mixing auger 42 and the mixture is transferred to the third mixing auger 68 by means of the chute 60 and bowl 66. Additive and water may further be added to the third mixing auger 68.

The mixture is further blended and carried toward the discharge end 72 of the third mixing auger 68. Cylinder 76 and the third auger swivel 78 are then activated to position the discharge end 72 of the third mixing auger 68 over the delivery site for placement of the concrete.

The operator may also control the speed of the conveyor 8, cross auger 18, and mixing augers 26, 42, 68 by adjusting the speed and direction of the associated drive motors. Also, the mixing augers may be automatically cycled between a forward and reverse direction to prevent the concrete from setting in the augers when the delivery of concrete is stopped for a few minutes or to further control the characteristics of the concrete mixture.

Having described the presently preferred embodiments of my invention, it is to be understood that it may otherwise be embodied within the scope of the appended claims.

I claim:

1. A cement mixer mounted to the chassis of a vehicle, said mixer comprising:
   (a) an aggregate bin mounted to a rear portion of said vehicle chassis;
   (b) a cement bin mounted to said chassis forward of said aggregate bin, with said cement bin having a dispensing means at a lower end thereof;
   (c) a cross auger disposed beneath the dispensing means of said cement bin and adapted to receive cement therefrom, with said cross auger having a dispensing end;
   (d) a conveyor extending through said aggregate bin and having a dispensing end in fluid communication with said cross auger;
   (e) a plurality of mixing augers mounted to said chassis and extending serially along one side thereof from said cross auger to a rear end of said chassis, each of said mixing augers having a dispensing end and a receiving end, with the dispensing end of one mixing auger in fluid communication with the receiving end of said mixing auger immediately adjacent thereto, with the receiving end of a first of said mixing augers in fluid communication with the dispensing end of said cross auger, each of said mixing augers having raising and lowering means attached thereto, and further including means for rotating a last of said mixing augers about its receiving end, whereby the dispensing end of said last mixing auger may be positioned for dispensing concrete;
   (f) a water tank mounted to said chassis and having means for dispensing water therefrom and into one or more of said mixing augers; and
   (g) an additive tank mounted to said chassis and having means for dispensing an additive therefrom and into one or more of said mixing augers.

2. The cement mixer of claim 1 further including means for rotating said first mixing auger about its receiving end, whereby the dispensing end of said first mixing auger may be positioned for dispensing concrete.

3. The cement mixer claimed in claim 1 wherein said mixing augers each include a helical auger fin, and said helical auger fins include a plurality of notches with outwardly extending tabs, with said notches spaced along an outer edge of each of said helical auger fins.

4. The cement mixer of claim 1 wherein each of said mixing augers includes an auger boot surrounding said helical auger fin and further includes means for adjusting said auger boot to modify the distance between an inner surface of said auger boot and an outer edge of said helical auger fin whereby the mixing capability of said mixing augers may be adjusted.

5. The cement mixer of claim 4 wherein said auger boot is formed of a flexible material.

6. The cement mixer of claim 5 wherein said means for adjusting said adjustable auger boot includes at least one elongated rod disposed along and in contact with said auger boot along an outer surface thereof and includes means for adjusting the position of said rod.

7. The cement mixer of claim 5 wherein said means for adjusting said adjustable auger boot include a pair of elongated rods disposed along the outer surface, in contact with and on opposite sides of said auger boot and includes means for adjusting the position of said rods.

8. A cement mixer mounted to the chassis of a vehicle, said mixer comprising:
   (a) an aggregate bin mounted to a rear portion of said vehicle chassis;
   (b) a cement bin mounted to said chassis forward of said aggregate bin, with said cement bin having a dispensing means at a lower end thereof;
   (c) a cross auger disposed beneath the dispensing means of said cement bin and adapted to receive cement therefrom, with said cross auger having a dispensing end;

(d) a conveyor extending through said aggregate bin and having a dispensing end in fluid communication with said cross auger;

(e) a plurality of mixing augers mounted to said chassis and extending serially along one side thereof from said cross auger to a rear end of said chassis, each of said mixing augers having a helical auger fin and said helical auger fins include a plurality of notches with outwardly extending tabs, with said notches spaced along an outer edge of each of said helical auger fins, with each of said mixing augers having a dispensing end and a receiving end, with the dispensing end of one mixing auger in fluid communication with the receiving end of the mixing auger immediately adjacent thereto, with the receiving end of a first of said mixing augers in fluid communication with the dispensing end of said cross auger, each of said mixing augers having raising and lowering means attached thereto, and further including means for rotating a last of said mixing augers about its receiving end, whereby the dispensing end of the last mixing auger may be positioned for dispensing concrete;

(f) a water tank mounted to said chassis and having means for dispensing water therefrom and into one or more of said mixing augers;

(g) an additive tank mounted to said chassis and having means for dispensing an additive therefrom and into one or more of said mixing augers.

9. The cement mixer of claim 8 further including means for rotating said first mixing auger about its receiving end, whereby the dispensing end of said first mixing auger may be positioned for dispensing concrete.

10. The cement mixer of claim 8 wherein each of said mixing augers includes an auger boot surrounding said helical auger fin and further includes means for adjusting said auger boot to modify the distance between an inner surface of said auger boot and an outer edge of said helical auger fin whereby the mixing capability of said mixing augers may be adjusted.

11. The cement mixer of claim 10 wherein said adjustable auger boot is formed of a flexible material.

12. The cement mixer of claim 11 wherein said means for adjusting said auger boot includes at least one elongated rod disposed along and in contact with said auger boot along an outer surface thereof and includes means for adjusting the position of said elongated rod.

13. The cement mixer of claim 11 wherein said means for adjusting said adjustable auger boot includes a pair of elongated rods disposed along the outer surface, in contact with and on opposite sides of said auger boot and includes means for adjusting the position of said rods.

14. A cement mixer mounted to the chassis of a vehicle, said mixer comprising:
(a) an aggregate bin mounted to a rear portion of said vehicle chassis;
(b) a cement bin mounted to said chassis forward of said aggregate bin, with said cement bin having a dispensing means at a lower end thereof;
(c) a cross auger disposed beneath the dispensing means of said cement bin and adapted to receive cement therefrom, with said cross auger having a dispensing end;
(d) a conveyor extending through said aggregate bin and having a dispensing end in fluid communication with said cross auger;

(e) a plurality of mixing augers mounted to said chassis and extending serially along one side thereof from said cross auger to a rear end of said chassis, each of said mixing augers having a helical auger fin and said helical auger fins include a plurality of notches with outwardly extending tabs, with said notches spaced along an outer edge of each of said helical auger fins, with each of said mixing augers having a dispensing end and a receiving end, with the dispensing end of one mixing auger in fluid communication with the receiving end of the mixing auger immediately adjacent thereto, with the receiving end of a first of said mixing augers in fluid communication with the dispensing end of said cross auger, each of said mixing augers having raising and lowering means attached thereto, and further including means for rotating a last of said mixing augers about its receiving end, whereby the dispensing end of the last mixing auger may be positioned for dispensing concrete, each of said mixing augers including an auger boot surrounding said helical auger fin and means for adjusting said auger boot to modify the distance between an inner surface of said auger boot and an outer edge of said helical auger fin whereby the mixing capability of said mixing augers may be adjusted, said means for adjusting said adjustable auger boot including a pair of elongated rods disposed along an outer surface, in contact with and on opposite sides of said auger boot and each rod in communication with means for adjusting the position of said rod that includes at least one rod receiving bracket mounted to said mixing auger and adjacent its outer surface, a guide pin slidably carried by said bracket and having one end mounted to said elongated rod and an adjustment bolt threadably carried by said bracket and having an end in contact with said elongated rod, whereby rotation of said rod adjusting screw will adjust the position of the rod and flex the auger boot to varying positions;

(f) a water tank mounted to said chassis and having means for dispensing water therefrom and into one or more of said mixing augers; and
(g) an additive tank mounted to said chassis and having means for dispensing an additive therefrom and into one or more of said mixing augers.

15. The mixing auger of claim 14 wherein said helical auger fin includes a plurality of notches with outwardly extending tabs, with said notches spaced along an outer edge of said helical auger fin.

16. A cement mixer mounted to the chassis of a vehicle, said mixer comprising:
(a) an aggregate bin mounted to a rear portion of said vehicle chassis;
(b) a cement bin mounted to said chassis forward of said aggregate bin, with said cement bin having a dispensing means at a lower end thereof;
(c) a cross auger disposed beneath the dispensing means of said cement bin and adapted to receive cement therefrom, with said cross auger having a dispensing end;
(d) a conveyor extending through said aggregate bin and having a dispensing end in fluid communication with said cross auger;
(e) a plurality of mixing augers mounted to said chassis and extending serially along one side thereof from said cross auger to a rear end of said chassis, each of said mixing augers having a dispensing end and a receiving end, with the dispensing end of one mixing auger in fluid communication with the receiving end of said mixing auger immediately adjacent thereto, with the receiving end of a first of said mixing augers in fluid communication with the dispensing end of said cross auger, each of said mixing augers having raising and lowering means attached thereto, and further including means for rotating a last of said mixing augers about its receiving end, whereby the dispensing end of said last mixing auger may be positioned for dispensing concrete, each of said mixing augers including an auger boot surrounding said helical auger fin and means for adjusting said auger boot to modify the distance between an inner surface of said auger boot and an outer edge of said helical auger fin whereby the mixing capability of said mixing augers may be adjusted, said means for adjusting said adjustable auger boot including at least one elongated rod disposed along and in contact with said auger boot and in contact with said auger boot along an outer surface thereof and means for adjusting the position of said rod that includes at least one rod receiving bracket mounted to said mixing auger and adjacent its outer surface, a guide pin slidably carried by said bracket and having one end mounted to said elongated rod and an adjustment bolt threadably carried by said bracket and having an end in contact with said elongated rod, whereby rotation of said rod adjusting screw will adjust the position of the rod and flex the auger boot to varying positions;

(f) a water tank mounted to said chassis and having means for dispensing water therefrom and into one or more of said mixing augers; and (g) an additive tank mounted to said chassis and having means for dispensing an additive therefrom and into one or more of said mixing augers.

17. A cement mixer mounted to the chassis of a vehicle, said mixer comprising:
   (a) an aggregate bin mounted to a rear portion of said vehicle chassis;
   (b) a cement bin mounted to said chassis forward of said aggregate bin, with said cement bin having a dispensing means at a lower end thereof;
   (c) a cross auger disposed beneath the dispensing means of said cement bin and adapted to receive cement therefrom, with said cross auger having a dispensing end;
   (d) a conveyor extending through said aggregate bin and having a dispensing end in fluid communication with said cross auger;
   (e) a plurality of mixing augers mounted to said chassis and extending serially along one side thereof from said cross auger to a rear end of said chassis, each of said mixing augers having a helical auger fin and said helical auger fins include a plurality of notches with outwardly extending tabs, with said notches spaced along an outer edge of each of said helical auger fins, with each of said mixing augers having a dispensing end and a receiving end, with the dispensing end of one mixing auger in fluid communication with the receiving end of the mixing auger immediately adjacent thereto, with the receiving end of a first of said mixing augers in fluid communication with the dispensing end of said cross auger, each of said mixing augers having raising and lowering means attached thereto, and further including means for rotating a last of said mixing augers about its receiving end, whereby the dispensing end of the last mixing auger may be positioned for dispensing concrete, each of said mixing augers including an auger boot surrounding said helical auger fin and means for adjusting said auger boot to modify the distance between an inner surface of said auger boot and an outer edge of said helical auger fin whereby the mixing capability of said mixing augers may be adjusted, said means for adjusting said adjustable auger boot including at least one elongated rod disposed along and in contact with said auger boot and in contact with said auger boot along an outer surface thereof and means for adjusting the position of said rod that includes at least one rod receiving bracket mounted to said mixing auger and adjacent its outer surface, a guide pin slidably carried by said bracket and having one end mounted to said elongated rod and an adjustment bolt threadably carried by said bracket and having an end in contact with said elongated rod, whereby rotation of said rod adjusting screw will adjust the position of the rod and flex the auger boot to varying positions;

(f) a water tank mounted to said chassis and having means for dispensing water therefrom and into one or more of said mixing augers; and (g) an additive tank mounted to said chassis and having means for dispensing an additive therefrom and into one or more of said mixing augers.

18. A mixing auger comprising a helical auger fin; an auger boot formed of a flexible material surrounding said helical auger fin; and means for adjusting said auger boot to modify the distance between an inner surface of said auger boot and an outer edge of said helical auger fin that include at least one elongated rod disposed along and in contact with said auger boot along an outer surface thereof and means for adjusting the position of said elongated rod that include at least one rod receiving bracket mounted to said mixing auger and adjacent its outer surface, a guide pin slidably carried by said bracket and having one end mounted to said elongated rod and an adjustment bolt threadably carried by said bracket and having an end in contact with said elongated rod, whereby rotation of said rod adjusting screw will adjust the position of the rod and flex the auger boot to varying positions.

19. A cement mixer mounted to the chassis of a vehicle, said mixer comprising:
   (a) an aggregate bin mounted to a rear portion of said vehicle chassis;
   (b) a cement bin mounted to said chassis forward of said aggregate bin, with said cement bin having a dispensing means at a lower end thereof;
   (c) a cross auger disposed beneath the dispensing means of said cement bin and adapted to receive cement therefrom, with said cross auger having a dispensing end;
   (d) a conveyor extending through said aggregate bin and having a dispensing end in fluid communication with said cross auger;
   (e) a plurality of mixing augers mounted to said chassis and extending serially along one side thereof from said cross auger to a rear end of said chassis, each of said mixing augers having a dispensing end and a receiving end, with the dispensing end of one mixing auger in fluid communication with the receiving end of said mixing auger immediately adjacent thereto, with the receiving end of a first of said mixing augers in fluid communication with the dispensing end of said cross auger, each of said mixing augers having raising and lowering means attached thereto, and further including means for rotating a last of said mixing augers about its receiving end, whereby the dispensing end of said last mixing auger may be positioned for dispensing concrete, each of said mixing augers including an auger boot surrounding said helical auger fin and means for adjusting said auger boot to modify the distance between an inner surface of said auger boot and an outer edge of said helical auger fin whereby the mixing capability of said mixing augers may be adjusted, said means for adjusting said adjustable auger boot including a pair of elongated rods disposed along an outer surface thereof, in contact with and on opposite sides of said auger boot and each of said rods in communication with means for adjusting the position of said rod that includes at least one rod receiving bracket mounted to said mixing auger and adjacent its outer surface, a guide pin slidably carried by said bracket and having one end mounted to said elongated rod and an adjustment bolt threadably carried by said bracket and having an end in contact with said elongated rod, whereby rotation of said rod adjusting screw will adjust the position of the rod and flex the auger boot to varying positions;

(f) a water tank mounted to said chassis and having means for dispensing water therefrom and into one or more of said mixing augers; and (g) an additive tank mounted to said chassis and having means for dispensing an additive therefrom and into one or more of said mixing augers.

20. A mixing auger comprising a helical auger fin; an auger boot formed of a flexible material surrounding said helical auger fin; and means for adjusting said auger boot to modify the distance between an inner surface of said auger boot and an outer edge of said helical auger fin that include a pair of elongated rods disposed along an outer surface of, in contact with an on opposite sides of said auger boot and each of said rods in communication with means for adjusting the position of said elongated rod that includes at least one rod receiving bracket mounted to said mixing auger and adjacent its outer surface, a guide pin slidably carried by said bracket and having one end mounted to said elongated rod and an adjustment bolt threadably carried by said bracket and having an end in contact with said elongated rod, whereby rotation of said rod adjusting screw will adjust the position of the rod and flex the auger boot to varying positions.

21. The cement mixer of claim 1 wherein the plurality of mixing augers include a first mixing auger and said cement mixer further includes means for rotating said first mixing auger about its receiving end so that the dispensing end of said first mixing auger can be positioned for dispensing concrete.

22. The cement mixer of claim 8 wherein the plurality of mixing augers include a first mixing auger and said cement mixer further includes means for rotating said first mixing auger about its receiving end so that the dispensing end of said first mixing auger can be positioned for dispensing concrete.

23. The cement mixer of claim 16 wherein the plurality of mixing augers include a first mixing auger and said cement mixer further includes means for rotating said first mixing auger about its receiving end so that the dispensing end of said first mixing auger can be positioned for dispensing concrete.

24. The cement mixer of claim 18 wherein the plurality of mixing augers include a first mixing auger and said cement mixer further includes means for rotating said first mixing auger about its receiving end so that the dispensing end of said first mixing auger can be positioned for dispensing concrete.

* * * * *

UNITED STATES PATENT AND TRADEMARK OFFICE
CERTIFICATE OF CORRECTION

PATENT NO. : 4,768,884

DATED : September 6, 1988

INVENTOR(S) : Luther V. Elkin

It is certified that error appears in the above-identified patent and that said Letters Patent is hereby corrected as shown below:

Column 3 Line 35 "48" should read --68--.

Column 3 Line 46 "firs" should read --first--.

Column 4 Line 29 "drive" should read --driven--.

Column 4 Line 56 "room" should read --some--.

Claim 20 Column 14 Line 3 "an" (second occurrence) should read --and--.

Signed and Sealed this

Fourth Day of April, 1989

Attest:

DONALD J. QUIGG

Attesting Officer

Commissioner of Patents and Trademarks